Oct. 31, 1933.     R. E. LINN     1,932,791
TIRE COVER
Filed Jan. 4, 1932     2 Sheets-Sheet 1
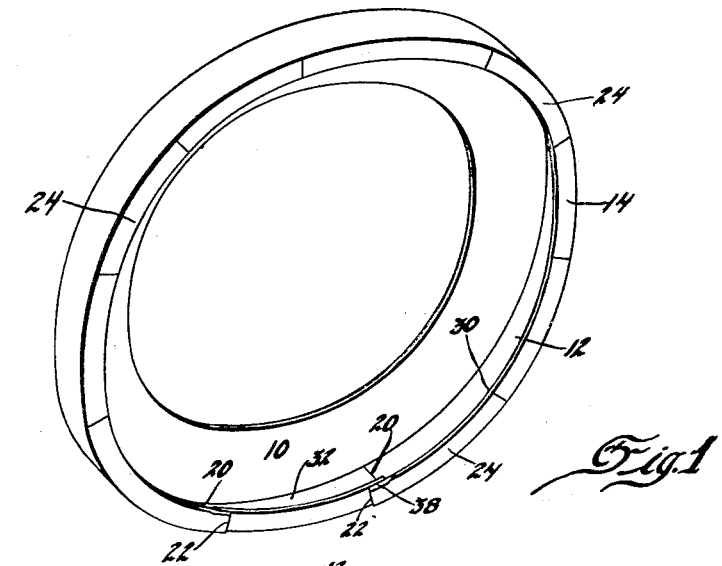
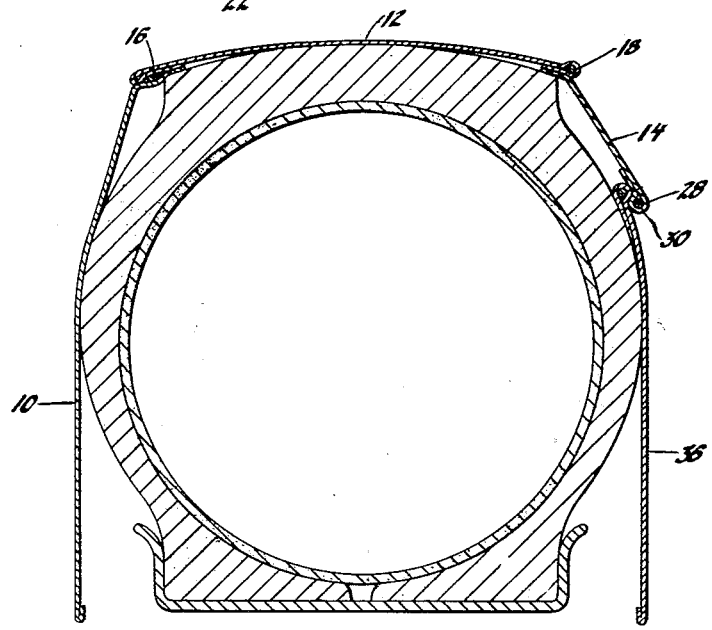
Inventor
Robert E. Linn
By Daniel G. Cullen
Attorney Oct. 31, 1933.  R. E. LINN  1,932,791
TIRE COVER
Filed Jan. 4, 1932   2 Sheets-Sheet 2
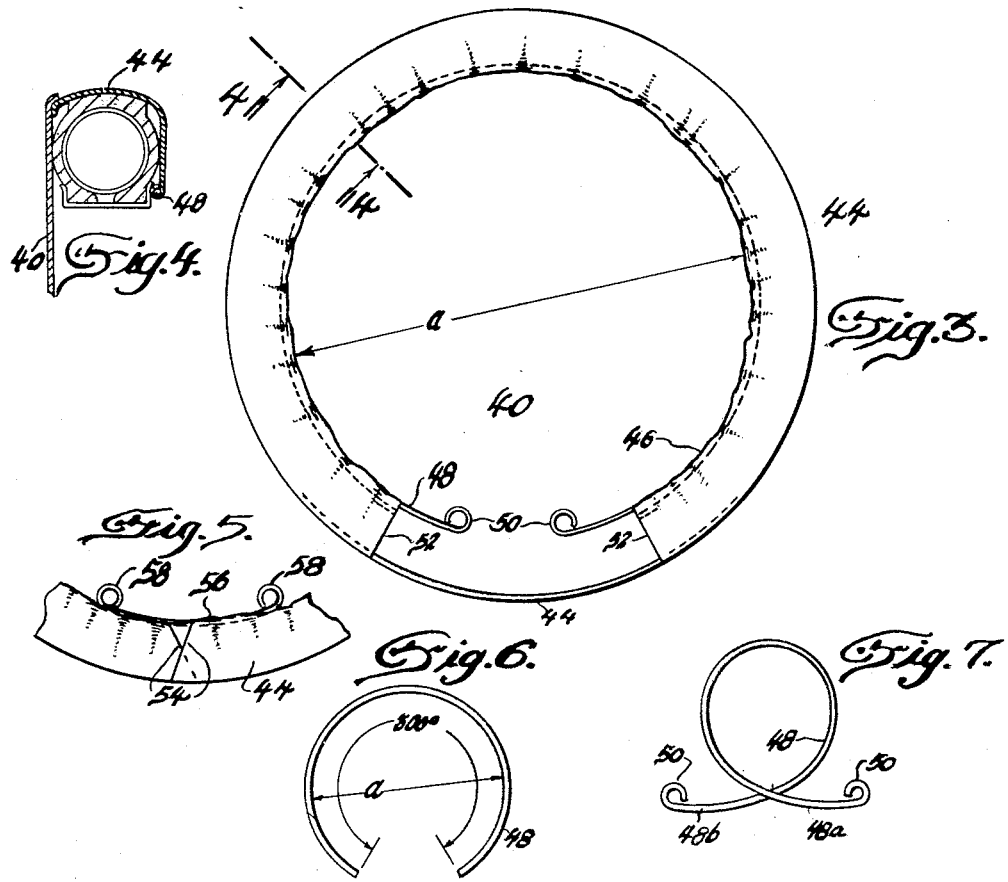
Inventor
Robert E. Linn
By
Daniel G. Cullen
Attorney Patented Oct. 31, 1933

1,932,791

UNITED STATES PATENT OFFICE 1,932,791

TIRE COVER

Robert E. Linn, Detroit, Mich.

Application January 4, 1932. Serial No. 584,683

12 Claims. (Cl. 150—54)

This invention relates to tire covers.

An object of this invention is a tire cover including an annular face portion and a segmental tread portion secured thereto and to which is secured a segmental rear portion, the latter and the tread portion being colinear and being more than 180 degrees and less than 360 degrees in extent. A tire cover thus formed can be mounted upon a tire very easily, as contrasted with tire covers commonly used at present.

A further object is a tire cover of the class described above having a flap secured to the face portion and adapted to fill the gap in the cover left by the cut away portions of the tread and rear portions. The free edge of the flap may be secured in place by the remaining portions of the tire cover, these last having for this purpose separable fasteners such as straps, buttons, hooks and eyes, or the like; or it may be held in place by the same means which holds the free edge of the rear portion against the tire.

A further object is a cover of the class described above having in the free edge of its rear portion a length of spring wire which normally tends to cause the ends of the rear portion free edge to approach each other but which permits the user of the cover to draw back the ends so that the tire cover may be slipped upon the tire.

A further object is a cover of the class described above having a segmental rear portion formed of a number of joined pieces so as to be form fitting with respect to the cover.

A further object is a cover of the class described above having a rear disc portion, which may be a complete disc or annulus, the disc portion being held in place against the rear wall of the tire by the same means which holds the rear portion of the cover against the tire.

A further object is a cover having a segmental rear and tread portion, the free edge of the rear portion being provided at its ends with a reinforcing means or piping, forming a pocket in which the ends of a spring wire can slide, if desired.

Still further objects will readily occur to those skilled in the art upon reference to the following description and the accompanying drawings in which Fig. 1 is a perspective view of an automobile tire cover.

Fig. 2 is a section view of the same, in place upon a tire.

Fig. 3 is a front view of another form of cover.

Fig. 4 is a section view of the same as if on the line 4—4 of Fig. 3.

Fig. 5 shows a portion of a modified form of cover.

Fig. 6 shows a blank from which the spring wire of Fig. 3 is formed.

Fig. 7 shows the spring wire of Fig. 3 free of the cover.

The tire cover shown includes an annular face portion 10, a tread portion 12 and a rear portion 14. The face portion 10 may be formed of a complete disc, such as is used in drum type covers or it may be formed as shown. In is joined at its outer edge to the tread portion 12 by a joint such as the one shown in Fig. 2, there being provided in its joint a reinforcing ring 16 which tends to expand and to hold distended a face portion 10, this construction being covered in a prior patent granted to Thomas J. McCormick, No. 1,765,735, June 3, 1930. If desired, further, the face 10 may be formed of a plurality of segments or sectors.

The tread portion 12 is joined to the rear portion 14 by any suitable joint, such as the one shown, and there may be provided, if desired, in the same, a ring of cord or twine, such as the one at 18.

The tread portion 12 and rear portion 14, as shown in Fig. 1, are not completely annular but terminate upon the lines 20—20 and 22—22. In other words, the tread portion and rear portion are colinear and are less than 360 degrees and more than 180 degrees in extent, the gap between lines 20—20 and 22—22 being anywhere from 30 to 60 degrees, as will be readily observed.

Further, the rear portion 14 may be made form-fitting if desired. That is to say, it may comprise a plurality of arcuate segments 24, such as those shown. This construction may also be used with the tread portion if desired, to render the whole tire cover form-fitting.

The tire cover thus described is the simplest embodiment of the invention and it may be mounted upon the tire in a very simple manner. Assuming a tire to be lying flat upon the ground, the operator will hold the cover with the face portion uppermost and substantially horizontal, his hands grasping the cover at the ends 22 of the rear portion 14. The operator will then draw the ends away from each other by rolling back the rear portion and perhaps the tread portion upon itself, thus opening up the cover. He will then slip the cover upon the tire, the face portion riding over the face of the tire, the upper portion of the tread and rear portions of the cover encompassing about one-half of the tire. With the cover in this position, the operation will release the ends 22 allowing them to move towards the tire and embrace the latter, thus holding the cover in place.

If desired, a length of spring wire 28 may be embedded in the free edge 30 of the rear portion, the wire serving to contract and to cause the ends 22 to approach each other, and to embrace the tire.

It also is contemplated to provide a flap such as the one shown at 32, the flap more than filling the gap between the ends 20—20 and 22—22. The flap 32 will be held against the cover by the contracting ends 22, these last overlapping the ends of the flap 32.

There is also provided, if desired, a disc portion such as the one shown at 36, the latter being held in place against a tire by the contracting free edge 30 of the rear portion.

Various modifications in the cover shown may be provided and such modifications are intended to be covered in this application. For example, the spring wire 28 may be omitted and reliance placed upon the form fitting rear and tread portions to hold the cover securely in place. Further, buttons, hook and eyes, or other fasteners may be used to hold the flap in its place, the fasteners connecting the ends 22 and the flap 32. Furthermore, a length of twine or cord may be inserted in the rear edge 30 as a reinforcing means instead of the wire. Further, if desired, the free edge 30, at the ends 22, may be reinforced by piping, etc., such as is shown at 38, to provide pockets in which the ends of the wire 28 will slide, it being understood that the spring wire 28 is movable with respect to the free edge.

The cover may also be made with or without the steel ring 16 as desired, with or without the back disc 36, form fitting or not, as desired, and with or without the flap, all of the foregoing forms being contemplated by the present invention.

In Fig. 3 there is disclosed a cover comprising a face disc 40 to whose outer edge there is attached a combined tread and rear face piece 44, the latter having in its free edge 46 a spring wire 48 of the form to be described, the ends of the wire 48 being rolled to form eyes 50. By virtue of the preforming of the piece 44 which, unlike the two-piece construction 12—14 of Fig. 2, is of one piece. The cover disclosed in Fig. 3 may be installed upon a tire very simply. The cover is held with its face 40 uppermost, the eyes 50 are grasped by the operator and are thrust back, opening up the cover so that it can be slipped upon the tire, after which the spring 48 contracts, drawing the free edge 46 inwardly and smoothening the tread portion and a portion of the rear face of the piece 44.

One important difference in the action of the covers of Figs. 2 and 3 may be observed. In the cover of Fig. 2, the ends 22 are bent back and whereas in the form of Fig. 3, the covers open up, the ends not being bent back radially but the whole free edge 46 loosening, or to be more exact, the lower diametrical ends of the edge 46 loosening, as will be observed.

The distance between the ends 52 of the cover piece 44 may be in the neighborhood of 60 degrees although, as will be observed in Fig. 5, these ends may be brought together as at 54 so as to overlap, it being understood, of course, that the cut lines 54 extend from the face piece 40 to the free edge 56. In this form, the spring wire 48 is so formed that when the cover is in place, the eyes 58 will overlap.

One of the characteristics of the cover of Figs. 2 and 3 is the spring wire or ring in the free edge of the rear face piece.

Referring to Figs. 6 and 7 which show construction of the spring wire 48, it will be seen that wire 48 is initially formed to encompass about 300 degrees of a circle whose diameter $a$ is substantially equal to the diameter $a$ of the free edge 46, when the cover is mounted upon the tire. Then the blank is tempered or spring tensioned so that if the ring 48 be permitted to assume its shape without restriction, it will have overlapping terminal portions 48$a$ and 48$b$, the eyes 50 being provided as will be observed, the spring assuming the shape similar to the letter $e$ of the lower case English script alphabet.

Now having described the invention and the preferred embodiments thereof, it is to be understood that the said invention is to be limited, not to the specific details herein set forth, but only by the scope of the claims which follow:

What I claim is:

1. A unitary tire cover including a relatively rigid radially inexpansible front portion, and a split rim like portion secured thereto and considerably less than 360° and considerably more than 180° in length, the gap thus provided extending across the tread of the tire from the rear free edge of the rim portion to the front portion, and an arcuate split-ring spring wire secured to the rear free edge of the rim like portion and having an inherent tendency to contract when the cover is in tire-covering position for drawing the ends of such edge towards each other, the ends of the rim like portion, of the wire, and of the rear free edge being free of each other so as to be relatively movable outwardly and oppositely.

2. A unitary tire cover including a relatively rigid radially inexpansible front portion, and a split rim like portion secured thereto and considerably less than 360° and considerably more than 180° in length, the gap thus provided extending across the tread of the tire from the rear free edge of the rim portion to the front portion, and an arcuate split-ring spring wire secured to the rear free edge of the rim like portion and having an inherent tendency to contract when the cover is in tire covering position for drawing the ends of such edge towards each other, the ends of the rim like portion, of the wire, and of the rear free edge being free of each other so as to be relatively movable outwardly and oppositely, the rim like portion including a tread part and a rear part coterminous therewith.

3. A unitary tire cover including a relatively rigid radially inexpansible front portion, and a split rim like portion secured thereto and considerably less than 360° and considerably more than 180° in length, the gap thus provided extending across the tread of the tire from the rear free edge of the rim portion to the front portion, and an arcuate split-ring spring wire secured to the rear free edge of the rim like portion and having an inherent tendency to contract when the cover is in tire covering position for drawing the ends of such edge towards each other, the ends of the rim like portion of the wire, and of the rear free edge being free of each other so as to be relatively movable outwardly and oppositely, the wire being initially tempered to assume the shape of the lower case, English script letter "e".

4. A unitary tire cover including a radially inexpansible front portion, and a split rim like portion secured thereto and considerably less than 360° and considerably more than 180° in length, the gap thus provided extending across the tread of the tire from the rear free edge of the rim portion to the front portion, and an arcuate split-ring spring wire secured to the rear free edge of the rim like portion and having an inherent tendency to contract when the cover is in tire covering position for drawing the ends of such edge towards each other, the ends of the rim like portion, of the wire, and of the rear free edge being free of each other so as to be relatively movable outwardly and oppositely.

5. A unitary tire cover including a radially inexpansible front portion, and a split rim like portion secured thereto and considerably less than 360° and considerably more than 180° in length, the gap thus provided extending across the tread of the tire from the rear free edge of the rim portion to the front portion, and an arcuate split-ring spring wire secured to the rear free edge of the rim like portion and having an inherent tendency to contract when the cover is in tire covering position for drawing the ends of such edge towards each other, the ends of the rim like portion, of the wire, and of the rear free edge being free of each other so as to be relatively movable outwardly and oppositely, the rim like portion including a tread part and a rear part coterminous therewith.

6. A unitary tire cover including a radially inexpansible front portion, and a split rim like portion secured thereto and considerably less than 360° and considerably more than 180° in length, the gap thus provided extending across the tread of the tire from the rear free edge of the rim portion to the front portion, and an arcuate split ring spring wire secured to the rear free edge of the rim like portion and having an inherent tendency to contract when the cover is in tire covering position for drawing the ends of such edge towards each other, the ends of the rim like portion, of the wire, and of the rear free edge being free of each other so as to be relatively movable outwardly and oppositely, the wire being initially tempered to assume the shape of the lower case, English script letter "e".

7. A cover of the character described in claim 4, wherein the front portion is of pliable material and is provided with rigidifying and stiffening means.

8. A cover of the character described in claim 5, wherein the front portion is of pliable material and is provided with rigidifying and stiffening means.

9. A cover of the character described in claim 6, wherein the front portion is of pliable material and is provided with rigidifying and stiffening means.

10. A unitary tire cover including a radially inexpansible front portion, and a split rim like portion secured thereto considerably more than 180° in length, the gap thus provided extending across the tread of the tire from the rear free edge of the rim portion to the front portion, and an arcuate split ring spring wire secured to the rear free edge of the rim like portion and having an inherent tendency to contract when the cover is in tire position for drawing the ends of such edge towards each other, the ends of the rim like portion, of the wire, and of the rear free edge being free of each other so as to be relatively movable outwardly and oppositely, the wire being initially tempered to assume the shape of the lower case, English script letter "e".

11. A cover of the character described in claim 10, wherein the front portion is of pliable material and is provided with rigidifying and stiffening means.

12. A unitary tire cover including a relatively rigid radially inexpansible front portion, and a split rim like portion secured thereto considerably more than 180° in length, the gap thus provided extended across the tread of the tire from the rear free edge of the rim portion to the front portion, and an arcuate split ring spring wire secured to the rear free edge of the rim like portion and having an inherent tendency to contract when the cover is in tire covering position for drawing the ends of such edge towards each other, the ends of the rim like portion of the wire, and of the rear free edge being free of each other so as to be relatively movable outwardly and oppositely, the wire being initially tempered to assume the shape of the lower case, English script letter "e".

ROBERT E. LINN.